United States Patent [19]
Benderly et al.

[11] Patent Number: 5,820,839
[45] Date of Patent: Oct. 13, 1998

[54] PROCESS FOR THE DECOMPOSITION OF HYDROGEN CYANIDE, AMMONIA, OR MIXTURES THEREOF IN THE GAS PHASE

[75] Inventors: Abraham Benderly; Jimmy Tai-Nin Chow, both of Houston; Parviz Taami-Ala, Humble, all of Tex.

[73] Assignee: Rohm and Haas Company, Phila, Pa.

[21] Appl. No.: 920,322

[22] Filed: Aug. 22, 1997

[51] Int. Cl.[6] .......................... C01B 21/082; C01C 3/04; B01J 8/02
[52] U.S. Cl. .......................... 423/235; 423/236; 423/237; 423/239.1
[58] Field of Search ..................... 423/235, 236, 423/237, 239.1, 245.3; 95/116, 128; 588/205

[56] References Cited

U.S. PATENT DOCUMENTS

| | | | |
|---|---|---|---|
| 4,040,990 | 8/1977 | Neely | 260/2.1 R |
| 4,839,331 | 6/1989 | Maroldo et al. | 502/416 |
| 5,273,663 | 12/1993 | Kurek et al. | 210/759 |
| 5,403,798 | 4/1995 | Brendley, Jr. et al. | 502/38 |
| 5,460,792 | 10/1995 | Rosenbaum et al. | 423/245.3 |

OTHER PUBLICATIONS

"Low–Temperature Decompostion of Some Halogenated Hydrocarbons Using Metal Oxide Porous Carbon Catalyst", S. C. Petrosius, R. S. Drago, V. Young, and G. C. Grunewald, J. Am. Chem. Soc. 1993, 115, pp. 6131–6137.

*Primary Examiner*—Gary P. Straub
*Assistant Examiner*—Milan M. Vinnola
*Attorney, Agent, or Firm*—Kevin Gironda; John Lemanowicz

[57] ABSTRACT

Hydrogen cyanide or ammonia present in a gaseous stream is decomposed catalytically in the presence of oxygen at relatively low temperature by contact with carbonaceous adsorbents doped with oxides of first row transition metals, silver or lanthanide elements, preferably with cobalt, chromium, manganese, silver, and cerium, in the presence or absence of a gaseous reducing agent such as a hydrocarbon or a volatile carboxylic acid.

9 Claims, No Drawings

PROCESS FOR THE DECOMPOSITION OF HYDROGEN CYANIDE, AMMONIA, OR MIXTURES THEREOF IN THE GAS PHASE

This application claims the benefit of the U.S. Provisional application Ser. No. 60/024,629, filed on Aug. 27, 1996.

This invention relates to the gas phase decomposition of hydrogen cyanide (HCN), ammonia ($NH_3$), or a mixture of these gases. More specifically, it relates to gas phase catalytic decomposition carried out under relatively mild thermal conditions, in the presence of oxygen and a catalyst comprising a metal oxide adsorbed onto certain types of carbonaceous adsorbents.

The reduction or complete removal (scrubbing) of HCN or $NH_3$ or both from liquid or gaseous mixtures has been a long-standing and formidable challenge to the chemical industry. Current technologies practiced in the chemical industry rely on expensive, complex, or energy intensive processes, such as flaring or elaborate chemical treatments such as the use of metal chelates (U.S. Pat. No. 5,273,663). A low cost, simple, low energy process for converting HCN, $NH_3$, or mixtures thereof to environmentally acceptable gases such as carbon dioxide and nitrogen would be highly desirable to the industry.

We have discovered a new catalytic process whereby HCN, $NH_3$, or mixtures thereof are decomposed to nitrogen and carbon dioxide.

One embodiment of the invention provides a process for the decomposition of HCN, $NH_3$, or a mixture thereof to form nitrogen and carbon dioxide by contacting gases selected from the group consisting of hydrogen cyanide, ammonia, or mixtures thereof with an effective amount of oxygen and a carbonaceous adsorbent having a multimodal pore-size distribution, at a temperature of from 100° –300° C.

The carbonaceous adsorbent may further contain one or more metal oxides selected from the group consisting of first row transition metals, silver and lanthanides. It has surprisingly been found that the addition of these metal oxides to the carbonaceous adsorbent further improves the catalytic decomposition of HCN, $NH_3$, or mixtures thereof.

Typically, oxygen is present at a ratio of from 1:1 to 4:3 (oxygen:$NH_3$, HCN, or mixture thereof), based on the total volume of gas. The effective amount of oxygen will vary based on the total amount of $NH_3$, HCN, or mixtures thereof to be decomposed.

The carbonaceous adsorbents, or "supports", used in the process of the present invention are carbon rich materials having pores of varying sizes ("a multimodal pore-size distribution") and large pores ("macropores") ranging from about 500 to about 100,000 Angstrom units (Å). The supports may be made by partially pyrolyzing synthetic, macroporous copolymer particles containing macropores of the size stated. As used throughout this specification, these will be referred to as "hard carbon" supports. Preferably, the hard carbon support is made from a polystyrene divinylbenzene sulfonic acid ion-exchange resin. In addition to the polymers disclosed in U.S. Pat. No. 4,040,990, any of the polysulfonated polymers disclosed in U.S. Pat. No. 4,839,331 and having macropore size above 50 Å, can be employed in preparing the hard carbon support useful in the catalyst of the process of the present invention.

The supports comprise at least 85% by weight carbon and typically have a carbon-to-hydrogen atom ratio of between about 1.5:1 to about 20:1. The remainder of the support comprises metal oxide catalyst. The preferred hard carbon substrate, which is prepared by the pyrolysis of a resinous polymer, contains at least three distinct sets of pores of differing average size, as measurable by their average diameter. One set comprises macropores, which originate from the resinous polymer, and typically range in size of at least 500 Å. The second set comprises intermediate pores, ("mesopores"), which typically range in size from about 20 Å to about 500 Å. The third set and smallest pores, ("micropores"), originate on pyrolysis of the resinous polymer. The micropores typically are less than about 20 Å in average diameter, although the exact size, average diameter and volume, depends on the temperature of pyrolysis as known in the art (e.g. as described in U.S. Pat. No. 5,403, 798). The catalyst support of the present invention can possess a variety of pore volumes, sizes and surface areas within the ranges stated above. Although other sources of carbonaceous support are contemplated, provided that the support may be formed having the multimodal pore size distribution stated, the preferred source is a macroporous synthetic polymer which is partially pyrolyzed to form the support.

The catalyst of the invention comprises the carbonaceous adsorbents as previously described which are especially doped with metal oxides. The metal oxide "dopants" used in the process of the present invention are the oxides of first-row transition metals, silver, and lanthanide metals. These include the first-row transition metals: scandium (Sc), titaniun (Ti), vanadium (V), chromium (Cr), manganese (Mn), iron (Fe), cobalt (Co), nickel (Ni), copper (Cu) and zinc (Zn). The lanthanide metals include cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). The metal oxide dopants of these metals are prepared within the carbonaceous adsorbents by known methods (e.g. U.S. Pat. No. 5,403,798, or as described in U.S. Pat. No. 5,460,792, and from polysulfonated polymers in U.S. Pat. No. 4,839,331). The metal oxides are present within the pores of the carbonaceous adsorbent at a level of from 0.1% to 15% based on the total weight of the carbonaceous adsorbent.

In a preferred embodiment, the metal oxides are present in the carbonaceous adsorbent at a level of from 1.2% to 10% based on the total weight of the carbonaceous adsorbent. In the most preferred embodiment, the metal oxides are present in the carbonaceous adsorbent at a level of from 7% to 9% based on the total weight of the carbonaceous adsorbent. A preferred series of dopants includes the oxides of Cr, Co, Fe, Mn, and Ce, such as $CrO_3$, CoO, FeO and $Fe_2O_3$, $KMnO_4$ and $CeO_2$; more preferred are the oxides of Cr, Co and Mn due to their cost and availability.

The process of the invention comprises contacting the gas containing HCN, $NH_3$, or a mixture thereof, with the carbonaceous adsorbent having a multimodal pore-size distribution within the previously mentioned temperature range of between 100° C. and 300° C. Preferred is a temperature range of from 190° C. to 280° C. Most preferred is a temperature range of from 230° C. to 270° C. A gaseous reducing agent also may be present, as described below. It is believed that one of the contributing factors in the high conversion to nitrogen, and the corresponding low levels of $N_2O$ produced, is a decomposition of $N_2O$ to nitrogen by the catalytic process of the present invention. The presence of a reducing agent ensures that a reducing atmosphere exists for the $NH_3$ catalytic oxidation. Suitable reducing agents include, for example, ($C_1$–$C_{10}$) alkanes and relatively volatile carboxylic acids, for example carboxylic acids having a normal (1 atmospheric pressure) boiling point below about 200° C. Preferred hydrocarbons include those having from 1 to 10 carbons; preferred carboxylic acids are acetic and propionic acid.

The carbonaceous adsorbent may be deactivated by deposits of organic materials. Another embodiment of the invention involves regenerating the carbonaceous adsorbent by treating the carbonaceous adsorbent with steam at a temperature preferably in the range of 200° to 250° C.

The following examples are intended to demonstrate the catalytic decomposition processes of the invention. All reagents were of commercial quality. All amounts stated for vaporous or gaseous hydrogen cyanide, ammonia and their products are in parts per million (ppm), and percents are by weight, unless otherwise indicated. The abreviations used are mlliliter (mL), liter (L), minutes (min), hour (hr), gram (g), infrared (IR), weight (wt), percent (%), gas chromatography/mass spectroscopy (GC/MS), Example (Ex.), standard temperature and pressure (STP), temperature in degrees centigrade (Temp ° C.), concentration (Conc.), and mass spectrometry abundance.

The catalyst was prepared by the reported procedure of Drago, Brendley et al. in J. Am. Chem. Soc., 115, 6131–6137, 1993. Fifty grams of the catalyst (containing 1.2 to 9.5 wt % metal oxide) was used in the experiments, unless indicated otherwise. Vaporous (hereafter "gaseous") mixture streams containing HCN or $NH_3$ (and water vapors) were generated by bubbling air (70 ml/min) or a gas mixture of helium: oxygen at an 80:20 volume ratio (30–60 mL/min) into a warm (45°–73° C.) aqueous solution (250 g) containing from about 5,000 to 10,000 ppm of HCN or $NH_3$. The gaseous mixtures were fed into a column containing the catalyst for 2–4 hours at 190° to 250° C., and the resulting gases exiting the column were trapped in 250 grams of 10% caustic solution and then 250 g of 4 wt % boric acid solution. The initial and final cyanide or ammonia concentrations in the starting aqueous solutions as well as the caustic solution were analyzed by standard cyanide or ammonia analytical procedures. The trapped $CO_2$ in the caustic solution was analyzed by ion chromatography. The gaseous mixture also was analyzed by IR spectroscopy and GC/MS. An IR spectrum was taken and a (100 uL to 900 uL) sample of exit gases analyzed every forty minutes for four hours.

IR spectra were taken with a demountable short-path gas cell (Perkin Elmer 0186–2180) using a Perkin Elmer Spectrometer Spectrum 2000. Gas samples were analyzed using a Hewlett Packard Series II, 5890 gas chromatograph apparatus connected to a Hewlett Packard 5970 Series Mass Selective Detector. The column employed was an AT-Alumina Alltech column, 30 m (length)×0.53 mm (diameter).

EXAMPLES 1–10

Catalytic Decomposition of Hydrogen Cyanide in the Gas Phase Using The Ambersorb®563 Adsorbent Resin/Cobalt(II) Oxide (CoO) Catalyst System These examples were run according to the procedures above to demonstrate the catalytic decomposition of hydrogen cyanide in the gas phase using an Ambersorb®563 Adsorbent Resin/CoO catalyst system. The results are shown in Tables I and II.

TABLE I

The Catalytic Decomposition Of Hydrogen Cyanide In The Gas Phase Using Ambersorb ® 563 Adsorbent Resin/CoO 1.2% at 70 ml/min

| | | | Conc. of HCN deivered | | | Results in caustic trap | | |
|---|---|---|---|---|---|---|---|---|
| Ex. | Gas Carrier | Temp °C. | HCN g | mL at STP | Gas phase ppm | HCN g | Reduction % | $Na_2CO_3$ ppm |
| 1 | Air | 190 | 0.085 | 74.6 | 8881 | 0 | 100 | 504 |
| 2 | Air | 190 | 0.09 | 74.6 | 8881 | 0 | 100 | 416 |
| 3 | Air | 190 | 0.501 | 414.8 | 49381 | 0.034 | 93.3 | 6200 |
| 4* | Argon | 190 | 0.51 | 423.1 | 50369 | 0.5 | 0 | 2200 |
| 5 | Air | 190 | 0.37 | 307 | 36654 | 0.02 | 95.5 | 3700 |
| 6 | Air | 190 | 0.51 | 423.1 | 50369 | 0.03 | 94.7 | 6000 |
| 7 | Air | 190 | 1.7 | 1410 | 83946 | 0.001 | 99.8 | NA |

*= Comparative Example

TABLE II

The Catalytic Decomposition Of Hydrogen Cyanide In The Gas Phase Using Ambersorb ® 563 Adsorbent Resin/CoO 7.7% at 70 ml/min.

| | | | Conc. of HCN delivered | | | Results in caustic trap | | |
|---|---|---|---|---|---|---|---|---|
| Ex. | Gas Carrier | Temp °C. | HCN g | mL at STP | Gas phase ppm | HCN g | Reduction % | $Na_2CO_3$ ppm |
| 8 | Air | 250 | 0.346 | 287.3 | 10638.9 | 0 | 100 | 9495.8 |
| 9 | Air | 250 | 1.943 | 1612 | 67174.1 | 0 | 100 | 14566 |
| 10 | Air | 250 | 1.585 | 1316 | 56222 | 0 | 100 | 11900 |

In Tables I and II, hydrogen cyanide was demonstrated to be decomposed effectively by using Ambersorb® Adsorbent Resin/Metal Oxide catalyst systems at temperatures between 190°–250° C. Exit gasses were monitored and no hydrogen cyanide was detected. Only carbon dioxide was found in the exit gasses. The replacement of air with argon gas (comparative #4) resulted in the total recovery of HCN. This demonstrated that the presence of oxygen was important in the catalytic decomposition process.

EXAMPLE 11

The Reproducibility Of The Catalytic Decomposition Of HCN In The Gas Phase Using The Ambersorb®563 Adsorbent Resin/CoO System Example 11 was run according to the procedures above to investigate the reproducibilty of the catalytic decomposition of HCN in the gas phase using the Ambersorb®563 Adsorbent Resin/CoO system. Nine runs for HCN decomposition were made in which 7.13 g of HCN were processed. The results are shown in Table III.

TABLE III

The Reproducibility Of The Ambersorb ® 563 Adsorbent Resin/CoO Catalyst System

| Gas | # of Runs | # of g oxidized | Total time/h | g/hr | Avg ppm in gas phase/ppm | Conversion % |
|---|---|---|---|---|---|---|
| HCN | 9 | 7.13 | 24 | 0.29 | 41349 | 98.14 |

Table III demonstrates the Ambersorb® Adsorbent Resin/CoO catalyst system showed good reproducibility. The conversion exceeded 98% at a high rate based on the average results shown in Table I and II.

EXAMPLE 12

The Catalytic Activity Of Undoped Versus Doped Ambersorb® Adsorbent Resin

S. Drago, et.al. observed that undoped carbon supports have a significant catalytic activity toward the oxidation of chlorinated hydrocarbon. The oxidation of $CH_2Cl_2$ at 250° C. with Ambersorb®572 Adsorbent Resin and Ambersorb®563 Adsorbent Resin resulted in 78% and 69% conversion, respectively. The same supports doped with 14% $CrO_3$ lead to 99.9% oxidation of $CH_2Cl_2$, an approximate 30% increase in conversion over the undoped carbon supports. Similar observations to those of Drago were noted in tests of the HCN system: Specifically, undoped Ambersorb®563 Adsorbent Resin support showed an average of 56.4% conversion whereas a catalyst impregnated with CoO gave 98.14% conversion under the conditions demonstrated in Tables I and II (above).

EXAMPLES 13–15

The Catalytic Decomposition Of Hydrogen Cyanide In The Gas Phase Using Ambersorb®572 Adsorbent Resin/Chromium(VI) Oxide [$CrO_3$]8.5%

These examples were run according to the procedures above to demonstrate that hydrogen cyanide gas can be decomposed efficiently to nitrogen and carbon dioxide, by using Ambersorb®572 Adsorbent Resin/$CrO_3$8.5%, varying the flow rate and loading different solution concentrations of hydrogen cyanide. The experiments were run using a stream of helium:oxygen 80:20 wt % (Air Liquide certified). Infrared spectra were performed and gas samples were analysed by FTIR and GC/MS respectively during a four hour process. Nitrogen and nitrous oxide abundance responses were determined from the mass spectra. The results are shown in Table IV.

TABLE IV

Results From The Catalytic Decomposition Of HCN Using A572 ® Adsorbent Resin/$CrO_3$ 8.5%

| Ex. | Flow Rate mL/min | Temp °C. | Initial Conc. HCN/ppm | Average Nitrogen Abundance | Average Nitrous Oxide Abundance | Results in caustic trap | |
|---|---|---|---|---|---|---|---|
| | | | | | | HCN gr | Reduction % |
| 13 | 30 | 230 | 11000 | 932286 | None | 0 | 100 |
| 14 | 60 | 230 | 4470 | 3023333 | None | 0 | 100 |
| 15 | 60 | 230 | 9577 | 1785000 | None | 0 | 100 |

Table IV demonstrates that hydrogen cyanide gas can be decomposed efficiently to nitrogen and carbon dioxide, by using Ambersorb®572 Adsorbent Resin/$CrO_3$8.5%, varying the flow rate and loading different solution concentrations of hydrogen cyanide.

EXAMPLES 16–18

The Catalytic Decomposition Of Hydrogen Cyanide In The Gas Phase Using Ambersorb®572 Adsorbent Resin/$CrO_3$ 8.5% With Reducing Agents Examples 16–18 were run according to the procedures above to demonstrate that the use of either heptane or acetic acid in order to reduce any remaining nitrous oxide to nitrogen in the catalytic decomposition of hydrogen cyanide was not necessary with the Ambersorb®572 Adsorbent Resin/$CrO_3$ catalyst system. The results are shown in Table V.

TABLE V

Results From The Catalytic Decomposition Of HCN Using
Ambersorb ® Adsorbent Resin/CrO₃ 8.5% With Reducing Agents

| Ex. | Agent | HCN ppm | Reducing Agent ppm | HCN Oxidized | Flow Rate mL/min | Ratio HCN/Red | Ratio $N_2/N_2O$ |
|---|---|---|---|---|---|---|---|
| 16 | Acetic Acid | 5074 | 10000 | 4545 | 60 | 0.5074 | 24.5 |
| 17 | Acetic Acid | 9576 | 5000 | 7740 | 60 | 1.9152 | 25.6 |
| 18 | Heptane | 9423 | 5000 | 8372 | 60 | 1.8846 | 156 |

Agent = Reducing Agent

Table V demonstrates the fact that reducing agents improve the catalytic decomposition of HCN to nitrogen. The ratio of $N_2/N_2O$ increased when the reducing agent was changed from acetic acid to heptane. Table V also demonstrates that the Ambersorb®572 Adsorbent Resin/CrO₃ catalyst system is a strong decomposition agent and that heptane is a better reducing agent than acetic acid based on the ratio of $N_2/N_2O$.

EXAMPLES 19–21

The Catalytic Decomposition Of Hydrogen Cyanide In The Gas Phase Using Ambersorb®572 Adsorbent Resin/Manganese Oxide (MnO) 9.5%

Examples 19–21 were run according to the procedures above to determine if an Ambersorb®572 Adsorbent Resin/MnO catalyst system would catalytically decompose HCN. The results are shown in Table VI.

TABLE VI

Results From The Catalytic Decomposition Of HCN Using
Ambersorb ® 572 Adsorbent Resin/MnO 9.5%

| Ex. | Flow Rate mL/min | Temp °C. | Initial Conc. HCN/ppm | Ratio N2/N2O | Results in caustic trap HCN g | Reduction % |
|---|---|---|---|---|---|---|
| 19 | 60 | 230 | 4570 | 46 | 0 | 100 |
| 20 | 30 | 230 | 9038 | 264 | 0 | 100 |
| 21 | 30 | 230 | 9731 | Infinity | 0 | 100 |

Table VI demonstrates that the Ambersorb®572 Adsorbent Resin/MnO 9.5% system effectively catalytically decomposed hydrogen cyanide.

EXAMPLES 22–28

The Catalytic Decomposition Of Ammonia Using Ambersorb®563 Adsorbent Resin/CoO and Ambersorb®572 Adsorbent Resin/CrO₃ Systems Examples 22–28 were run according to the procedures above to demonstrate that ammonia can be decomposed using Ambersorb® Adsorbent Resin/Metal Oxide catalyst systems at temperatures between 230°–250° C. The results are shown in Tables VII and VIII.

TABLE VII

The Catalytic Decomposition Of $NH_3$ In The Gas Phase Using
Ambersorb ® 563 Adsorbent Resin/CoO 7.7%

| Ex. | Air Flow rate mL/min | Bed Temp °C. | Initial ppm | Final ppm | Delivered ppm | Trapped ppm | Oxidized ppm | Conv. % |
|---|---|---|---|---|---|---|---|---|
| 22 | 80+/−30 | 260–280 | 10337.2 | 162.79 | 10174 | 33.9 | 10136 | 99.62 |
| 23 | 85+/−15 | 230–250 | 8765.23 | 1634.6 | 7130.6 | 30.38 | 7100.2 | 99.57 |
| 24 | 100+/−15 | 240–260 | 8456.72 | 1520 | 6936.7 | 1178.8 | 5757.9 | 83.01* |
| 25 | 60+/−5 | 270–278 | 9176.81 | 781 | 8395.8 | 925.28 | 7470.5 | 88.97* |

*= Unaged Catalyst Systems

TABLE VIII

The Catalytic Decomposition Of $NH_3$ In The Gas Phase Using
Ambersorb ® 572 Adsorbent Resin/CrO₃ 8.5%

| Ex. | Flow rate mL/min | Gas carrier | Bed Temp °C. | Initial ppm | Final ppm | Delivered ppm | Oxidized ppm | Conv. % |
|---|---|---|---|---|---|---|---|---|
| 26 | 65 | Air | 240–242 | 17896 | 14901 | 2995 | 2995 | 100 |
| 27 | 60 | He:O₂ | 230–235 | 14901 | 8125.3 | 6776 | 6776 | 100 |

TABLE VIII-continued

The Catalytic Decomposition Of $NH_3$ In The Gas Phase Using
Ambersorb ® 572 Adsorbent Resin/$CrO_3$ 8.5%

| Ex. | Flow rate mL/min | Gas carrier | Bed Temp °C. | Initial ppm | Final ppm | Delivered ppm | Oxidized ppm | Conv. % |
|---|---|---|---|---|---|---|---|---|
| 28 | 75 | He:$O_2$ | 230–233 | 8125.3 | 4147 | 3978.3 | 3978.3 | 100 |

Tables VII and VIII demonstrate that ammonia can be decomposed using Ambersorb® Adsorbent Resin/Metal Oxide catalyst systems at temperatures between 230°–250° C.

EXAMPLE 29–32

Determination of Exit Gases of the Catalytic Decomposition of Ammonia in the Gas Phase Examples 29–32 were run according to the procedures above to determine if both the Ambersorb®563 Adsorbent Resin/CoO catalyst bed system and the Ambersorb®572 Adsorbent Resin/$CrO_3$ system decompose ammonia to nitrogen and nitrous oxide. The results are shown in Table IX.

TABLE IX

Qualitative And Quantitative Analysis Of The Catalytic Decomposition
Of $NH_3$ In The Gas Phase, Using Different Variables

| Ex. | Catalyst Bed | Flow rate mL/min | Bed Temp °C. | Process time/min | Carrier Gas | $NH_3$ conv. % | IR Gas Analysis | Ratio $N_2/N_2O$ |
|---|---|---|---|---|---|---|---|---|
| 29 | A563/CoO | 60+/–5 | 250–260 | 265 | Air | 80 | $NH_3/N_2O$ | N.A. |
| 30 | A572/$CrO_3$ | 200+/–5 | 225–239 | 335 | He:$O_2$ | 7.8 | $N_2O$ | 2.02 |
| 31 | A572/$CrO_3$ | 60+/–5 | 230–235 | 305 | He:$O_2$ | 100 | $N_2O$ | 5.15 |
| 32 | A572/$CrO_3$ | 30+/–5 | 227–236 | 245 | He:$O_2$ | 100 | None | ∞ |

Table IX demonstrates that the Ambersorb®563 Adsorbent Resin/CoO catalyst bed system did not decompose all the ammonia to nitrogen and nitrous oxide. Some ammonia traces were seen through Infrared Spectroscopy. The Ambersorb®572 Adsorbent Resin/$CrO_3$ system decomposed ammonia into nitrogen and nitrous oxide. A ratio of $N_2/N_2O$ was estimated by varying the flow rate. At higher flow rates, lower ratios of $N_2/N_2O$ were determined. This means that more nitrous oxide was produced and not all the ammonia was decomposed. At lower flow rates, higher ratios of $N_2/N_2/N_2O$ were determined. This means that more nitrogen was produced and all the ammonia was decomposed. Example 31 shows that at a low flow rate of 30 mL/min, only nitrogen can be obtained.

EXAMPLES 33–37

The Catalytic Decomposition Of $NH_3$ In The Gas Phase Using Ambersorb®572 Adsorbent Resin/$CrO_3$ 8.5% And Reducing Agents Examples 33–37 were run according to the procedures above to determine if the addition of reducing agents to the Ambersorb®572 Adsorbent Resin/$CrO_3$ system would result in only nitrogen being formed upon the catalytic decomposition of ammonia. The results are shown in Table X.

TABLE X

The Addition Of Reducing Agents To Ammonia In The
Ambersorb ® 572 Adsorbent Resin/$CrO_3$ System

| Ex. | Agent | Ammonia ppm | Agent ppm | Ratio $NH_3$/Red | Ratio $N_2/N_2O$ | $NH_3$ conv. % |
|---|---|---|---|---|---|---|
| 33 | None | 13545.9 | None | ∞ | 5.7 | 100 |
| 34 | Heptane | 14271.4 | 9000 | 1.6 | ∞ | 100 |
| 35 | Acetic Acid | 15800.9 | 9900 | 1.6 | 7.68 | 100 |
| 36 | Acetic Acid | 12700 | 20000 | 0.635 | 69 | 85.69 |
| 37 | Acetic Acid | 5222.05 | 10000 | 0.522 | ∞ | 100 |

Table X demonstrates that the addition of reducing agents to the Ambersorb®572 Adsorbent Resin/$CrO_3$ system will result in only nitrogen being formed upon the catalytic decomposition of ammonia. Both heptane and acetic acid served as good reducing agents under different conditions.

EXAMPLES 38–40

The Catalytic Decomposition Of $NH_3$ In The Gas Phase Using Ambersorb®572 Adsorbent Resin/$MnO_{9.5}$%

Examples 38–40 were run according to the procedures above to demonstrate that performance of the catalyst improves with time. The catalyst was run for 24 hours. Consecutive runs were made and compared. The results are shown in Table XI.

TABLE XI

Catalyst Performance Improvement With Time

| Exp | Flow Rate ml/min | $NH_3$ oxidized ppm | Temp C | Ratio $N_2/N_2O$ | $NH_3$ conv. % |
|---|---|---|---|---|---|
| 38 | 30 | 4503.4 | 230 | 35.5 | 100 |
| 39 | 30 | 5740.11 | 230 | ∞ | 100 |
| 40 | 60 | 4400.9 | 230 | ∞ | 100 |

The data above demonstrates, based on the N2/N20 ratio, that the performance of the catalyst improves with time.

We claim:

1. A process for the oxidation of hydrogen cyanide, ammonia, or a mixture thereof to form nitrogen and carbon dioxide by contacting gases selected from the group consisting of hydrogen cyanide, ammonia, or mixtures thereof with an effective amount of oxygen and a catalyst comprising one or more metal oxides selected from the group consisting of first row transition metals, silver and lanthanides supported on a carbonaceous pyrolyzed resinous polymer having a macropore size of at least 500 angstroms in average diameter, a mesopore size in the range from about 20 angstroms to about 500 angstroms in average diameter and a micropore size of less than 20 angstroms in average diameter at a temperature of from 100°–300° C.

2. The process of claim 1 wherein ammonia is in contact with the metal oxide in the presence of a vaporous reducing agent "in an amount sufficient to produce a reducing atmosphere during said oxidation" has been added.

3. The process of claim 2 wherein the vaporous reducing agent is selected from the group consisting of a ($C_1$ to $C_{10}$) hydrocarbon and a carboxylic acid having a boiling point below 200° C.

4. The process of claim 3 wherein the hydrocarbon is heptane and the carboxylic acid is acetic acid.

5. The process of claim 1 wherein the metal oxide is selected from the oxides of chromium, cobalt, iron, or manganese.

6. The process of claim 1 wherein the metal oxide is present at a level of from 0.1% to 15% based on the total weight of the catalyst.

7. The process of claim 1 further comprising the step of regenerating the catalyst by treating the catalyst with steam at a temperature in the range of 200° to 250° C.

8. A process for the oxidation of hydrogen cyanide, ammonia, or a mixture thereof to form nitrogen and carbon dioxide by contacting gases selected from the group consisting of hydrogen cyanide, ammonia, or mixtures thereof with an effective amount of oxygen and a catalyst comprised of a carbonaceous pyrolyzed resinous polymer having a macropore size of at least 500 angstroms in average diameter, a mesopore size in the range from about 20 angstroms to about 500 angstroms in average diameter and a micropore size of less than 20 angstroms in average diameter wherein said resinous polymer is made of polystyrene divinyl benzene sulfonic acid ion exchange resin.

9. The process of claim 8 further comprising the step of regenerating the catalyst by treating the catalyst with steam at a temperature in the range of 200° to 250° C.

* * * * *